(12) United States Patent
Legner (10) Patent No.: US 11,761,174 B2
(45) Date of Patent: Sep. 19, 2023

(54) DRIVE FOR A MACHINE

(71) Applicant: ZF Friedrichshafen AG, Friedrichshafen (DE)

(72) Inventor: Juergen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 648 days.

(21) Appl. No.: 16/977,830

(22) PCT Filed: Feb. 6, 2019

(86) PCT No.: PCT/EP2019/052821
§ 371 (c)(1),
(2) Date: Sep. 3, 2020

(87) PCT Pub. No.: WO2019/170343
PCT Pub. Date: Sep. 12, 2019

(65) Prior Publication Data
US 2021/0025139 A1 Jan. 28, 2021

(30) Foreign Application Priority Data

Mar. 9, 2018 (DE) .................... 10 2018 203 623.3

(51) Int. Cl.
*E02F 9/22* (2006.01)
*B60K 1/02* (2006.01)
(Continued)

(52) U.S. Cl.
CPC .............. *E02F 9/2246* (2013.01); *B60K 1/02* (2013.01); *B60L 1/003* (2013.01); *B60L 15/20* (2013.01);
(Continued)

(58) Field of Classification Search
CPC ....... E02F 9/2246; E02F 9/207; E02F 9/2235; E02F 9/2296; E02F 3/283; E02F 3/431; E02F 9/2075; E02F 9/2091; E02F 9/2095; B60K 1/02; B60L 1/003; B60L 15/20; B60L 2200/40; B60L 2220/42;
(Continued)

(56) References Cited

U.S. PATENT DOCUMENTS

| 2002/0148144 A1* | 10/2002 | Tokunaga | B60W 10/24 |
| | | | 903/903 |
| 2012/0055149 A1* | 3/2012 | Vonderwell | F15B 7/006 |
| | | | 60/486 |

(Continued)

FOREIGN PATENT DOCUMENTS

| DE | 102009055978 A1 | 6/2010 |
| DE | 102015111926 A1 | 1/2017 |

(Continued)

*Primary Examiner* — Tyler D Paige
(74) *Attorney, Agent, or Firm* — LEYDIG, VOIT & MAYER, LTD.

(57) ABSTRACT

A drive for a machine includes a computer configured to control a first electric motor for driving vehicle wheels and a second electric motor for driving a work attachment. The second electric motor is configured to drive at least one hydraulic pump with an adjustable stroke volume. A sensor is configured to detect the stroke volume of the pump. The computer processes the stroke volume to control the second electric motor.

6 Claims, 5 Drawing Sheets

(51) Int. Cl.
  *B60L 1/00* (2006.01)
  *E02F 9/20* (2006.01)
  *B60L 15/20* (2006.01)
  *E02F 3/28* (2006.01)
  *E02F 3/43* (2006.01)

(52) U.S. Cl.
  CPC ............ *E02F 9/207* (2013.01); *E02F 9/2235* (2013.01); *E02F 9/2296* (2013.01); *B60L 2200/40* (2013.01); *B60L 2220/42* (2013.01); *B60L 2240/423* (2013.01); *B60L 2250/26* (2013.01); *B60L 2260/22* (2013.01); *E02F 3/283* (2013.01); *E02F 3/431* (2013.01)

(58) Field of Classification Search
  CPC ........... B60L 2240/423; B60L 2250/26; B60L 2260/22; B60L 2260/30; B60L 15/2063; B60L 15/2072; Y02T 10/64; Y02T 10/72
  USPC .......................................................... 701/22
  See application file for complete search history.

(56) References Cited

U.S. PATENT DOCUMENTS

| | | | |
|---|---|---|---|
| 2013/0298544 A1* | 11/2013 | Izumi | B60K 6/28 60/413 |
| 2013/0304292 A1 | 11/2013 | Moriki et al. | |
| 2014/0176028 A1* | 6/2014 | Tobari | B60L 3/003 318/400.15 |
| 2015/0197239 A1 | 7/2015 | Vilar et al. | |
| 2021/0025139 A1* | 1/2021 | Legner | B60L 1/003 |
| 2022/0153255 A1* | 5/2022 | Legner | B60K 1/00 |
| 2022/0396137 A1* | 12/2022 | Glöckner | B60K 17/02 |

FOREIGN PATENT DOCUMENTS

| | | | | |
|---|---|---|---|---|
| DE | 102019214353 A1 * | 3/2021 | | |
| EP | 2775150 A1 | 9/2014 | | |
| EP | 3130708 A1 | 2/2017 | | |
| JP | 2006205777 A | 8/2006 | | |
| JP | 2015063271 A | 4/2015 | | |
| WO | WO-2019170345 A1 * | 9/2019 | ............ | B60W 10/08 |

* cited by examiner

DRIVE FOR A MACHINE

CROSS REFERENCE TO RELATED APPLICATIONS

This application is a U.S. National Stage Application under 35 U.S.C. § 371 of International Application No. PCT/EP2019/052821 filed on Feb. 6, 2019, and claims benefit to German Patent Application No. DE 10 2018 203 623.3 filed on Mar. 9, 2018. The International Application was published in German on Sep. 12, 2019 as WO 2019/170343 A1 under PCT Article 21(2).

FIELD

The invention relates to a drive of a machine, such as, for example, a wheel loader.

BACKGROUND

Generic drives have an electric motor which drives the vehicle wheels.

US 2015/0197239 A1 and EP 31 30 708 A1 disclose a wheel loader with an electric motor for driving the vehicle wheels.

SUMMARY

In an embodiment, the present invention provides a drive for a machine. The drive includes a computer configured to control a first electric motor for driving vehicle wheels and a second electric motor for driving a work attachment. The second electric motor is configured to drive at least one hydraulic pump with an adjustable stroke volume. A sensor is configured to detect the stroke volume of the pump. The computer processes the stroke volume to control the second electric motor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present disclosure describes improvement for a drive for a machine with an electric motor for driving vehicle wheels.

A drive according to the present disclosure has a computation unit which can receive signals from an accelerator pedal and which controls a first electric motor for driving the vehicle wheels. Furthermore, the computation unit controls a further motor which is suitable for driving a work attachment, for example by driving a hydraulic pump. It is possible for this further motor to be a second electric motor. However, it is also possible for this further motor to be a motor of a different design. In the following, however, for the sake of simplicity only the term second electric motor is used.

The first electric motor for driving the vehicle wheels and the second electric motor for driving the work attachment can be controlled separately from each other by means of the computation unit.

This makes it possible to control a machine such as, for example, a wheel loader in such a way that it has a similar driving behavior to today's diesel-engine-driven wheel loaders. As a result, it is possible to use a purely electric machine without the driver of a diesel-engine-driven machine having to become accustomed to it.

The machine can draw energy from a battery. However, it is also possible for the machine to have a fuel cell or other sources of electrical energy such as, for example, a connection to a network by means of a cable. This makes it possible to operate the machine purely electrically.

An accelerator pedal, which outputs a signal to the computation unit, is arranged in the driver's cab of the wheel loader. When the accelerator pedal is not actuated, it is possible to output a signal with 0%; when the accelerator pedal is fully actuated, it is possible to output a signal with 100%. Furthermore, a brake pedal is arranged to brake the vehicle. The brake pedal also outputs a signal to the computation unit. In the first pedal stroke or travel of the brake pedal, the brake pedal outputs a signal in order not to brake the vehicle yet by means of the service brake, but for what is known as an inching mode to be activated. In inching mode, the power and thus also the rotational speed of the motor for driving the work attachment should be increased and the power and thus also the torque at the vehicle wheels should be reduced. Furthermore, the wheel loader has a multifunction lever by means of which the operation of the work attachment, such as, for example, the lifting framework or lifting mechanism and the bucket, is possible and the direction of travel can be set and a driving range, for example a fast driving range and a slow driving range, can be selected. The vehicle also has a neutral switch and a parking brake actuator. The multifunction lever is preferably likewise connected to the computation unit.

In order to configure the electric work machine to behave like a diesel-engine machine, the first electric motor should be controllable as a function of the signal relating to the position of the accelerator pedal. For this purpose, the accelerator pedal has an analog sensor which detects the position of the accelerator pedal and is used as a specification for the rotational speed and the torque of the first electric motor. In this case, a memory unit is present in which a characteristic diagram with characteristic curves is stored, in which the torque of the first electric motor and the rotational speed of the first electric motor at a plurality of pedal positions of the accelerator pedal are stored. The characteristic curves are designed such that, when the first electric motor is at a standstill, the torque changes as a function of the pedal position. This is possible, for example, in that the maximum torque corresponds to the maximally actuated accelerator pedal and no torque corresponds to a non-actuated accelerator pedal. The torque can now be assigned linearly to the change in the accelerator pedal by assigning each position of the accelerator pedal from a plurality of positions of the accelerator pedal to a respective characteristic curve.

It is thereby possible to enable a driving behavior of the wheel loader in which the wheel loader can be brought to its traction limit of the wheels by changing the position of the accelerator pedal in order to fill the bucket.

It is also necessary for the characteristic curve to which an accelerator pedal position is assigned to have a defined maximum rotational speed which can be achieved with no torque. It is thereby possible, by means of the accelerator pedal, to maintain the speed even when the vehicle is moving in a terrain of the sort in which the vehicle does not require any torque.

If the vehicle is in overrun mode, a limited torque is advantageously specified in order to reproduce a known coasting or braking behavior for the driver. Since the braking torque in today's internal-combustion-engine drives is significantly smaller than the drive torque, the drive and thus the first electric machine should be transferred into the overrun mode whenever the maximum rotational speed at torque 0 at a corresponding pedal position of the accelerator pedal is exceeded. The braking torque should then increase with increasing rotational speed at a gradient up to a defined level and remain nearly constant even with a further increasing rotational speed. The maximum braking torque is preferably specified independently of the pedal position of the accelerator pedal.

It is also possible to increase the braking torque when the accelerator pedal is actuated less and to specify a lower braking torque when the accelerator pedal is actuated strongly.

If the vehicle has a selector switch for a fast driving range and a slow driving range, for example in the multifunction lever, then in the fast driving range the maximum rotational speed of the first electric motor is only limited at a very high, namely the technically reasonable maximum speed. When the slow driving range is selected, the rotational speed is limited much earlier as a function of the position of the accelerator pedal. For this purpose, the accelerator pedal position is divided from 0 to 100% to cover a rotational speed range of the first electric motor, wherein the maximum rotational speed in the slow driving range can correspond, for example, to one third of the maximum rotational speed of the fast driving range.

In order to use the vehicle optimally in inching mode, the vehicle has a brake pedal alongside the accelerator pedal. In inching mode, the power from the first electric motor is reduced and the power of the second electric motor is increased. For this purpose, the brake pedal can have an analog sensor which outputs a signal as a function of the position of the brake pedal. This signal is used as a specification for the reduction of the rotational speed and of the torque of the first electric motor for the driving operation. In the first part of brake pedal actuation, the service brake is not activated. In this part, the sensor signal is used for the inching operation, thus the reduction of the rotational speed and the torque of the first electric motor and the increase in the power of the second electric motor.

If the brake pedal is further depressed, the service brake will be additionally actuated.

In a further embodiment, the second electric motor, which drives the actuation of the work attachment, is controlled as a function of the signal of the accelerator pedal. It is possible to control the second electric motor not only as a function of the accelerator pedal signal but also as a function of the rotational speed of the first electric motor. The work attachment can be, for example, the lifting and bucket movement, which can be activated with a multifunction lever.

It is possible with the second electric motor to drive hydraulic pumps, the pressure media of which act on cylinders of the work attachment. These hydraulic pumps can be configured as constant pumps, thus pumps with a constant displacement volume, but it is also possible to use pumps with an adjustable displacement volume. When pumps with adjustable displacement volumes are used, load-sensing control can be used. When pumps with a constant displacement volume are used, the rotational speed of the second electric motor determines the delivered volume. The second electric motor is to be controlled in such a way that, without actuation of the accelerator pedal, the second electric motor has a minimum rotational speed, whereby a minimum volumetric flow can be delivered in order to be able to execute steering movements even when the vehicle is at a standstill. The pump, which is connected to the second electric motor, delivers a pressure medium to a steering valve, which applies a pressure medium to actuators for steering.

When the accelerator pedal is actuated, a rotational speed specification for the first electric motor is output via a characteristic curve which is stored in a memory unit. The more the accelerator pedal is actuated, the higher should be the rotational speed of the first electric motor. The rotational speed of the second electric motor is limited as a function of the rotational speed of the first electric motor. At a low rotational speed of the first electric motor, the rotational speed of the second electric motor up to the maximum rotational speed must be possible. At a higher rotational speed of the first electric motor, the rotational speed of the second electric motor can be reduced since in this case the vehicle has a higher speed and thus the work attachment, for example the lifting or bucket hydraulics, does not have to be moved quickly. However, a minimum rotational speed for steering the vehicle must be maintained, which is why the rotational speed of the second electric motor must not drop below a minimum rotational speed. By limiting the rotational speed of the second electric motor, efficiency is improved.

Preferably, pumps with a constant delivered volume which are driven by the second electric motor are used for machines of lower power. Machines of greater power use adjustable pumps, which are preferably used in combination with a load-sensing system. In the load-sensing system, the respective highest load pressure and the pump pressure of a pressure position are used for the adjustment of the pump in the case of a plurality of consumers. The pump always only delivers as much as the controlled consumers require in total. The pump pressure always corresponds to the consumer with the highest load. If no consumer is being controlled, the pump will only deliver the leakage oil flow.

In a further embodiment, this pump, which can be adjusted in its stroke volume, has a sensor by means of which the current delivered volume of the pump can be detected. This signal is used for the rotational speed specification of the second electric motor. In this case, the sensor signal is calibrated and interpreted. The signal can assume values between 0% and 100%. The rotational speed of the second electric motor can now be adapted to the corresponding demand as a function of the signal from the sensor. If no work function is actuated, for example the cylinders of the lifting mechanism are not being controlled, the sensor signal of the adjustable pump will be almost 0. In this state, the rotational speed specification for the second electric motor is controlled to a lower limit value. If the consumer is now actuated, for example the lifting mechanism is actuated, the load-sensing system will notify the work pump of a delivery demand and the work pump will increase its delivery quantity and the sensor signal will rise. The term work pump is used herein to denote the adjustable pump which is connected to the second electric motor. If the available delivery quantity of the work pump rises above the necessary amount, this will be recognized via a falling sensor signal of the work pump. A further increase in rotational speed is not expedient. The second electric motor is therefore controlled in such a way that it no longer increases its rotational speed. When the threshold value is undershot, the rotational speed specification for the second electric motor is reduced to the lower limit value via a control algorithm. The lower limit value is defined by a minimum volume flow, for example for steering. In order to stabilize the rotational speed specification for the second electric motor, a hysteresis between rising and falling sensor signals is present.

In addition, the change in the sensor signal over time can be used for the rotational speed specification of the second electric motor. A strongly rising or falling signal can affect the dynamics of the rotational speed specification.

In a further embodiment, sensors are located on the work attachment, for example the lifting mechanism and the bucket. It is also possible to detect an actuation of the lifting mechanism or the bucket with one or more sensors in the multifunction lever, by means of which the lifting mechanism can be controlled. Depending on the actuation of the lifting mechanism, the rotational speed of the second electric motor will adapt according to the demand.

The dependence of the rotational speed specification of the second electric motor on the accelerator pedal position and on the rotational speed of the first electric motor can remain. The sensor information, which detects an actuation of the lifting mechanism and the bucket, thus of the work attachment, is superimposed on this dependence.

The sensors in the multifunction lever or in the lifting mechanism and the bucket generate a proportional signal corresponding to the actuation of the lifting mechanism and the bucket. These sensor signals are calibrated and interpreted. Both signals can assume values between −100% and +100%. For the stroke movement, the sensor signal is calibrated to −100% for maximum lowering and +100% for maximum lifting. For the bucket movement, a sensor signal of −100% means a maximum downward tilting of the bucket and +100% a maximum upward tilting of the bucket. If the multifunction lever is not actuated, i.e. no movement is requested for the lift and the bucket, the sensors will each supply a signal of 0%. The rotational speed specification for the second electric motor should in each case use the larger value of the two sensor signals. If the signal from the sensors is 0%, no actuation of the working function will be provided, whereby the rotational speed specification for the second electric motor is controlled to a lower limit value. If the sensor now recognizes that the lifting mechanism should be moved, the rotational speed of the second electric motor will be increased as a function of the signal from the sensor.

In order to control the first electric motor and the second electric motor, the first electric motor and the second electric motor each have power electronics which can be arranged directly adjacent to the first electric motor and the second electric motor. It is also possible to arrange the power electronics at a different location. The power electronics of the first electric motor and the power electronics of the second electric motor are connected via a CAN bus system to a vehicle computer, also called a computation unit. It is also possible to additionally connect a display via the CAN. The vehicle computer obtains signals from a brake pedal, an accelerator pedal, a switch for the parking brake and a switch for the direction of travel, a switch for the driving speed between a fast and a slow driving speed, and a switch for a neutral position. When adjustable work pumps are used which are connected to the second electric motor, the vehicle computer can also obtain a signal from a sensor relating to the position of the stroke volume of the work pump.

Energy is supplied by a battery. However, it is also possible to configure the energy supply via an internal combustion engine which drives a generator, and it is possible to supply the vehicle with energy by means of a connection to a stationary power grid. It is also possible for a combination of these energy supplies to be present.

According to the operating strategy, the computation unit provides setpoint values for the rotational speed and the maximum torque to the power electronics of the first electric motor and to the power electronics of the second electric motor. The power electronics themselves regulate the two electric motors according to the specifications. The actual values of the rotational speed and the torque and the operating states of the two electric motors are reported back to the computation unit. This makes it possible to use standard power electronics which have only as much computing power to enable them to operate the electric motors.

The computation unit requires no additional outputs, but only inputs and the communication via the CAN. This is very cost-effective.

Figure 1:
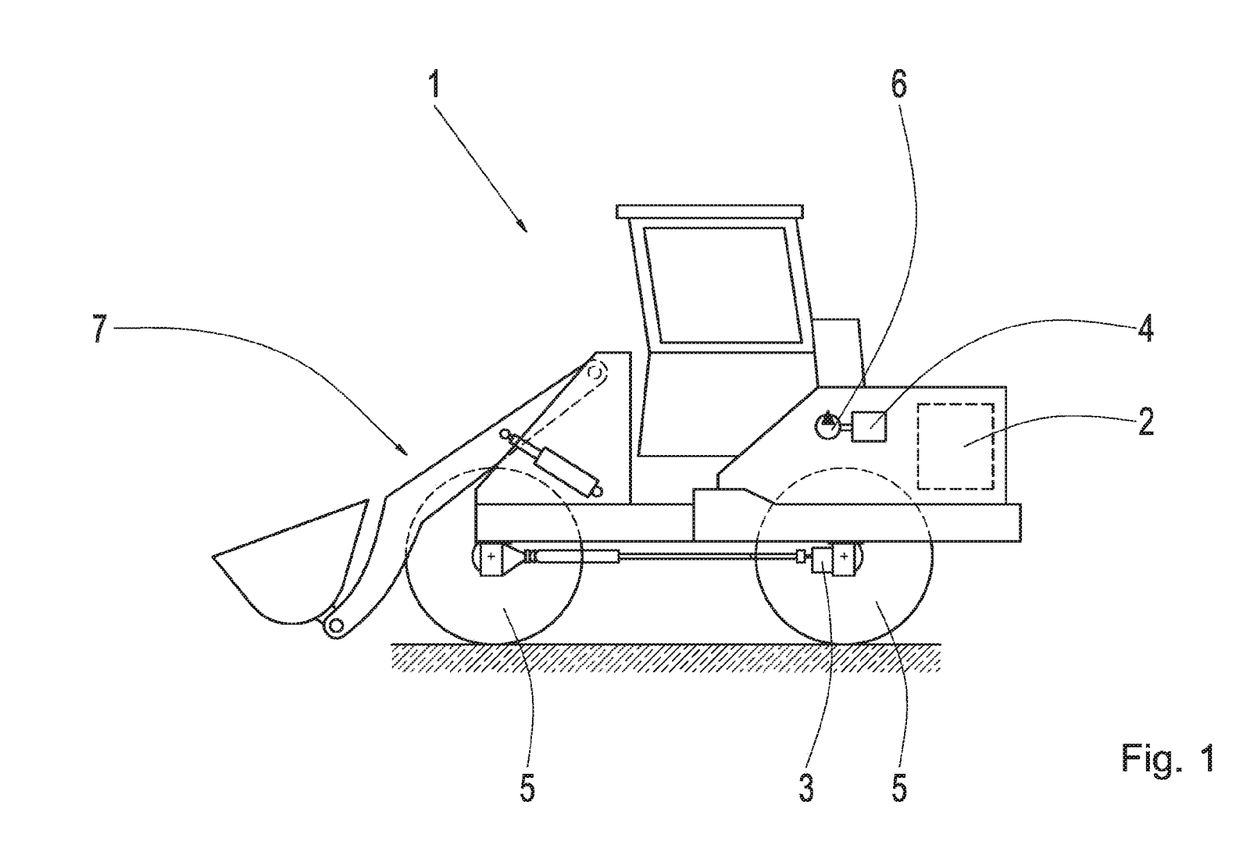
FIG. 1 depicts a wheel loader.

FIG. 1:

A wheel loader 1 has a battery 2 which provides the energy for the first electric motor 3 and the second electric motor 4. The first electric motor 3 drives the vehicle wheels 5. It is possible to use a plurality of electric motors instead of one first electric motor 3. The second electric motor 4 drives a pump 6, which is also called a work pump, and supplies the cylinders of the lifting mechanism 7 and the steering of the wheel loader 1 with a pressure medium. In the case of vehicles of lower power, the pump 6 can be designed as a pump with a constant stroke volume; in this case, a plurality of constant pumps can also be used. In the case of vehicles of greater power, it is also possible to configure the pump 6 as one or more pumps with an adjustable delivery volume. These pumps with an adjustable delivery volume are frequently designed as load-sensing pumps.

Figure 2:
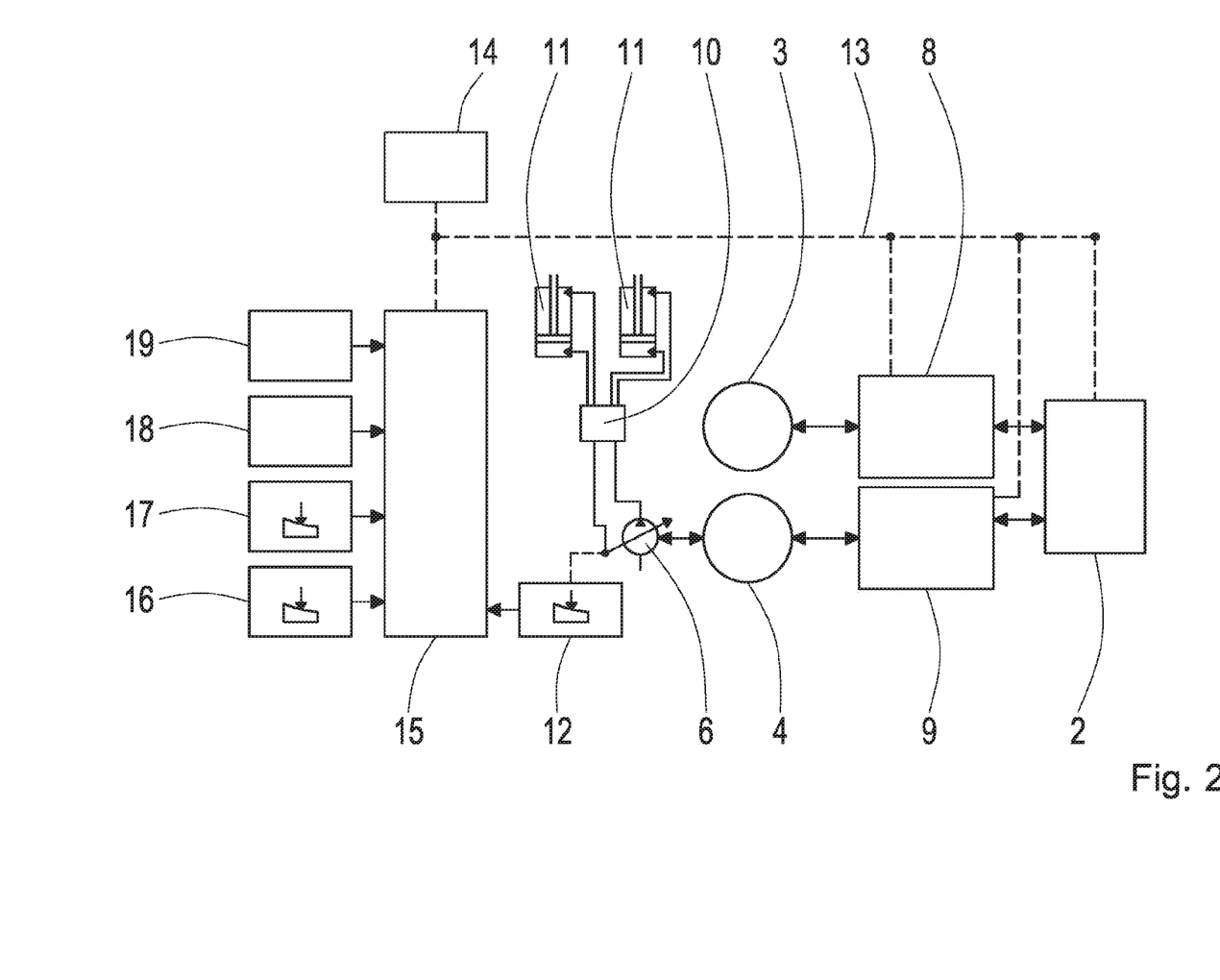
FIG. 2 depicts a diagram of the drive of the wheel loader.

FIG. 2:

The energy of the battery 2 is supplied to the first electric motor 3 via the power electronics 8. The energy of the battery 2 is supplied to the second electric motor 4 via the power electronics 9. The second electric motor 4 drives the pump 6 which is designed to be adjustable in its stroke volume. The first motor 3 drives vehicle wheels which are not depicted. Actuators 11 of the work attachment or of the steering system can be controlled using valves 10. In order to detect the current stroke volume of the pump 6, a sensor 12 is connected to the pump 6.

The battery 2, the power electronics 8, the power electronics 9, the sensor 12 and a display 14, on which the direction of travel, the speed, the driving range and other vehicle states are displayed, are connected via leads 13, for example by means of CAN, to a computation unit 15, which is also called a vehicle computer. The computation unit 15 obtains signals from a sensor of the brake pedal 16, a sensor of the accelerator pedal 17, a switch for the parking brake 18 and a plurality of switches and/or sensors in a multifunction lever 19 by means of which the speed driving range, a neutral function and further functions, such as, for example, the actuation of the actuators 11 of the work attachment, for example the bucket or the lifting mechanism, can be controlled. It is possible to configure the functions of the multifunction lever 19 in a lever. However, it is also possible to configure the individual sensors and switches in a plurality of switches and levers.

When the accelerator pedal 17, for example, is actuated, the computation unit 15 generates a signal for the first electric motor 3. The computation unit 15 also contains a memory unit, within which the characteristic curves, which are described in the further figures, are stored. On the basis of the signals which the computation unit 15 obtains and the stored characteristic curves, the computation unit 15 calculates a preliminary signal which the computation unit 15 outputs via the line 13. This makes it possible to configure the power electronics 8 and the power electronics 9 in such a way that they only have to be able to control the first electric motor 3 and the second electric motor 4.

When the pump 6 is used as a load-sensing pump, it is possible to determine the displacement of the stroke volume of the pump 6 by means of a sensor.

In a load-sensing system, the highest load pressure in each case and the pump pressure of a pressure compensator are used for the displacement of the pump in the case of a plurality of consumers. The pump always only delivers as much as the controlled consumers require in total. The pump pressure always corresponds to the consumer with the highest load. If no consumer is being controlled, the pump 6 will deliver only the leakage oil flow.

With the sensor at the displacement of the pump 6 the current delivery volume of the pump can be detected. This signal is now used for the rotational speed specification of the second electric motor 3. The sensor signal is calibrated and interpreted. The signal can assume values between 0% to 100%. By using this sensor at the adjustment of the pump 6, the rotational speed of the second electric motor 4 and thus the rotational speed of the pump 6 can be adapted to the demand and thus made more efficient.

If no actuation of the work attachment 11 takes place, the sensor signal of the displacement of the pump 6 will be nearly 0%. In this state, the rotational speed specification for the second electric motor 4 is controlled to a lower limit value. If a consumer, thus the work equipment 11, is now being controlled, the load-sensing system will notify the pump 6 of a delivery demand and the pump 6 will increase its delivery quantity and the sensor signal will rise. For the rotational speed specification of the second electric motor 4, a threshold value for the sensor signal is defined at which the pump 6 is at almost full displacement, for example 95%. If this threshold value is exceeded, this will be interpreted as insufficient delivery quantity and therefore the rotational speed specification for the working drive will be increased to the maximum value.

If the available delivery quantity rises above the necessary amount, this will be detected via a falling sensor signal of the work pump. A further increase in rotational speed is not expedient. If the threshold value is undershot, the rotational speed specification for the second electric motor 4 will be reduced to the lower limit value via a control algorithm.

In addition, hysteresis is used to stabilize the rotational speed specification around this threshold value.

It is also possible to use the change in the sensor signal over time for the rotational speed specification of the second electric motor 4. A strongly rising or falling signal can affect the dynamics of the rotational speed specification.

Figure 3:
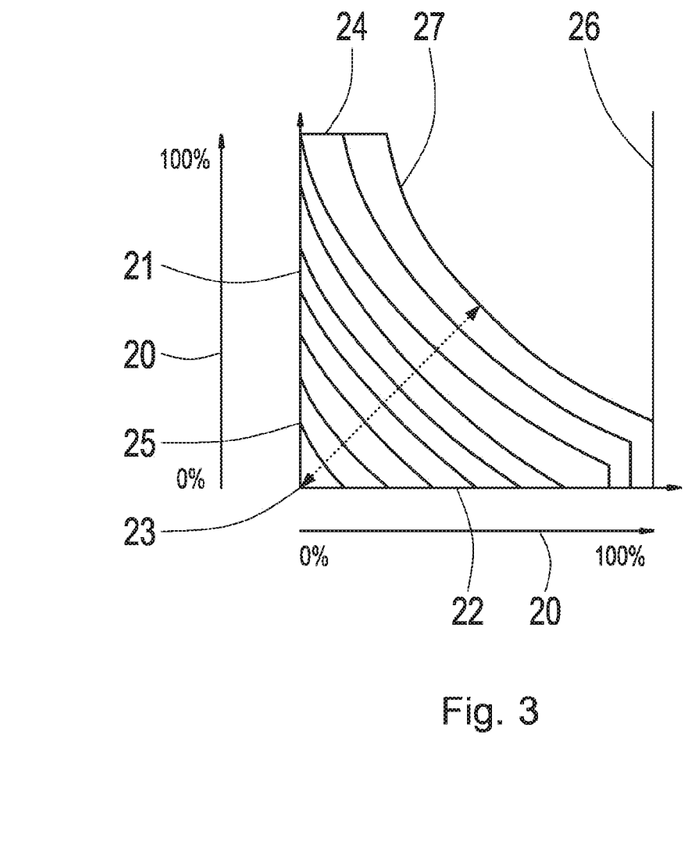
FIG. 3 depicts a characteristic diagram for controlling the first electric motor for a fast driving range.

FIG. 3:

The computation unit 15 from FIG. 2 stores characteristic curves which represent a fast driving range and a slow driving range. The diagram shown in FIG. 3 represents the fast driving range. When driving into the heap until the vehicle is at a standstill, for the driver of the wheel loader to be able to control the torque at the vehicle wheels when the vehicle is at a standstill, it is necessary to limit the torque of the first electric motor as a function of the position of the accelerator pedal. This makes it possible to generate a defined torque at the vehicle wheels at any position of the accelerator pedal when the vehicle is at a standstill, as a result of which the driver can control the vehicle as far as the traction limit via the accelerator pedal. For this purpose, the position of the accelerator pedal is determined by means of a sensor, wherein when the accelerator pedal is not actuated, the sensor outputs a signal which corresponds to the accelerator pedal signal 20 of 0%, and when the accelerator pedal is fully actuated, the sensor outputs a signal which corresponds to the accelerator pedal signal 20 of 100%. The characteristic curves in FIG. 3 are entered in a Cartesian coordinate system, wherein the coordinate represents the torque 21 of the first electric motor and the abscissa represents the rotational speed 22 of the first electric motor. Intersection points 25 which are assigned to a defined pedal position of the accelerator pedal are generated by forming intersection points of individual characteristic curves which, for example, can be distributed uniformly, once at the rotational speed 0 from the torque 0 23 to the maximum torque 24 over the accelerator pedal signal 20=100%. It is possible, for example, to generate these intersection points with a certain number of characteristic curves, for example 0%, 25%, 50%, 75% and 100%. The linear distribution is only exemplary; it is also possible to generate a non-linear distribution. The intermediate values between the characteristic curves are then interpolated. It is thus possible to generate a torque at the vehicle wheels at each accelerator pedal position when the vehicle is at a standstill. The same procedure is carried out at the rotational speed 22 of the first electric motor, as a result of which intersection points with the abscissa at 0 torque are likewise generated. So that the vehicle does not exceed the maximum permissible speed, the rotational speed 22 of the first electric motor is limited to a maximum rotational speed 26. It is thereby possible to regulate the speed of the vehicle by means of the accelerator pedal at very low or no torque. The diagram is then created in such a way that the maximum possible power is first plotted as a function of the accelerator pedal position. The maximum power is depicted in the line 27. In the further lines, the intersection points of the ordinate are connected to the intersection points of the abscissa.

The diagram shows only one quadrant of possible operation of the first electric motor. In this quadrant, the tensile range and the direction of rotation in a forward direction are shown. A similar or mirrored characteristic curve course can also be used in the opposite direction of rotation in the reverse direction. In overrun mode, a limited torque is advantageously specified in order to reproduce a usual coasting behavior or braking behavior. In today's internal combustion engine drives, the braking torque is significantly lower than the drive torque. The drive should always enter the overrun mode only when the intersection point of the rotational speed at 0 torque and the corresponding pedal position is exceeded. The generated braking torque should then increase with increasing rotational speed at a gradient up to a defined level and remain virtually constant even with a further increasing rotational speed. The maximum braking torque can be specified constantly and independently of the pedal position or be higher with low pedal actuation and lower with strong pedal actuation.

It is also possible to configure the vehicle to have only one driving range, wherein the diagram for the fast driving range is then used. If an additional slow driving range is used, an additional diagram corresponding to FIG. 4 will be configured.

Figure 4:
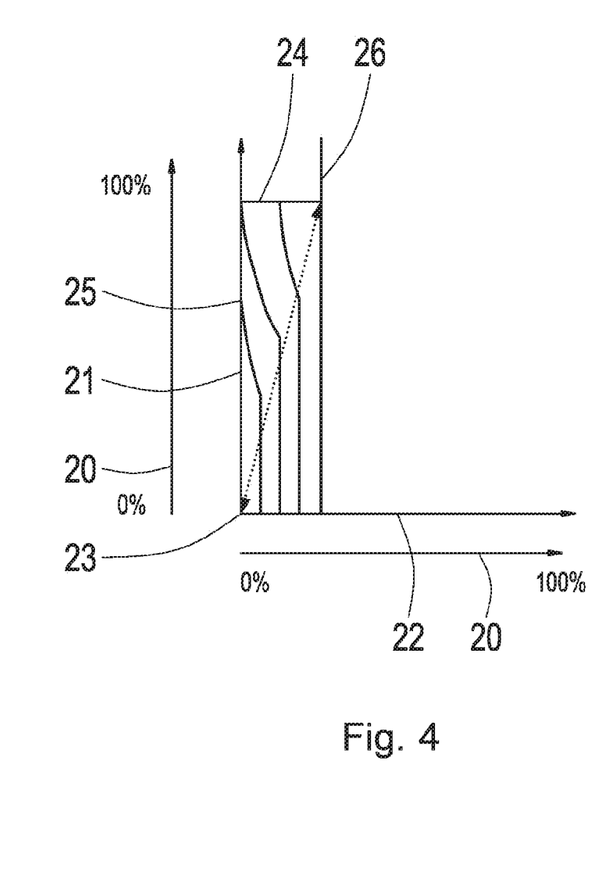
FIG. 4 depicts a characteristic diagram for controlling the first electric motor for a slow driving range.

FIG. 4:

The slow driving range depicted in FIG. 4 is required for positioning maneuvers with a fine accelerator pedal resolution, for example working with a loading fork. The term fine accelerator pedal resolution here means that the final speed is achieved in the slow driving range only when the accelerator pedal is fully actuated and not, as in the fast driving range, already in the first third of the actuation of the accelerator pedal. The intersection points 25 of the respective maximum torque at the rotational speed 0 are identical in this case to the intersection points 25 of the fast driving range in FIG. 3. However, the maximum rotational speed 26 is significantly reduced in comparison with the maximum rotational speed 26 in FIG. 3. However, the maximum rotational speed 26 in FIG. 4 is also achieved only at 100% of the accelerator pedal signal 20. The interfaces of the respective maximum rotational speed of the first driving motor are thereby scaled to lower rotational speeds at torque 0.

Figure 5:
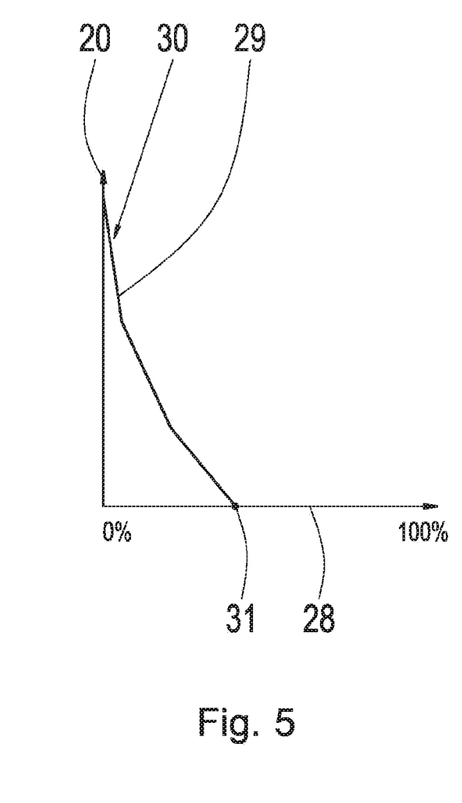
FIG. 5 depicts a characteristic curve when the brake pedal is actuated.

FIG. 5:

In order to also be able to reproduce an inching function, the signal of the brake pedal is processed in addition to the signal of the accelerator pedal. As a result, it is possible to operate the vehicle in the inching mode, i.e. to reduce the power and thus the torque and the rotational speed from the first electric motor and to increase the power, thus the rotational speed and the torque, for the second electric motor and thus the pump 6 in FIG. 2 for the work attachment, thus the steering and/or lifting and rotating of the bucket. For this purpose, the brake pedal position is detected via a sensor, preferably an analog sensor, and used as a specification for the reduction of the rotational speed and the torque, thus the power of the first electric motor for the driving drive.

For this purpose, the ordinate in FIG. 5 presents the current value of the signal 20 of the accelerator pedal between 0 and 100%, and the abscissa presents the signal of the brake pedal 28 from 0 to 100%. If the brake pedal is not actuated, the signal of the accelerator pedal will not be reduced. When the accelerator pedal is fully depressed, is thus at 100%, and the brake pedal is not actuated, the signal of the accelerator pedal 20 thus remains the same. The more the brake pedal is actuated, the more the signal of the accelerator pedal will be reduced. In the first part 29 of the brake actuation, the service brake is not activated, but the power for the first electric motor is reduced in that the signal of the accelerator pedal is reduced on the basis of the characteristic curve 30 and thus the first electric motor is controlled with a lower target signal. The rotational speed specification for the first electric motor is thus reduced more and more when the accelerator pedal is being held constantly and the brake pedal is being increasingly pressed. In this case, the characteristic curve 30 is configured in such a way that when the accelerator pedal is fully depressed, the signal of the accelerator pedal is already greatly reduced when the brake pedal is only slightly pressed. With the accelerator pedal actuated only slightly, the brake pedal has to be pressed very far in order to achieve a reduction in the signal of the accelerator pedal. The service brake is additionally activated starting from a previously defined actuation path of the accelerator pedal. At point 31, the characteristic curve 30 intersects the abscissa, which means that the accelerator pedal is not actuated, wherein this point 31 coincides either with the actuation path in which the service brake is actuated or is selected shortly after this actuation path of the brake pedal in order to ensure a corresponding overlap. A changed control of the first electric motor with respect to its rotational speed and its torque results from the accelerator pedal signal being correspondingly reduced by the characteristic curve 30 as a function of the actuation of the brake pedal.

Figure 6:
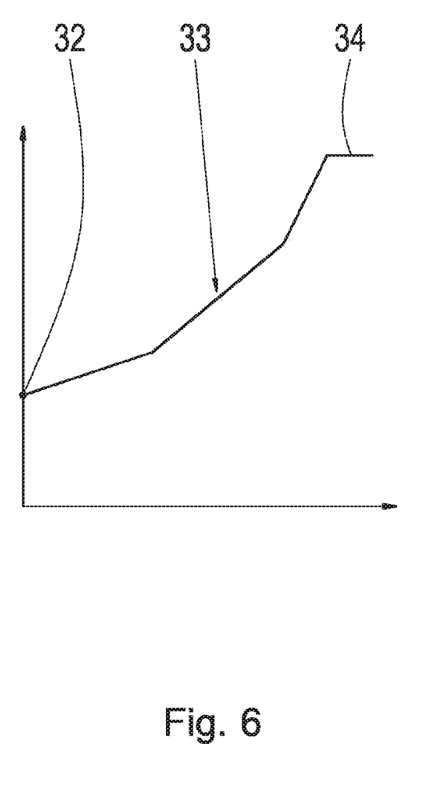
FIG. 6 depicts a characteristic curve for controlling the rotational speed of the second electric motor.

FIG. 6:

However, in order not only to control in a changed manner the first electric motor as a function of the actuation of the brake pedal, it is necessary to control the second electric motor as well. For this purpose, the vehicle has a multifunction lever in the driver's cab, by means of which the work attachment, for example the lifting and bucket movement, can be controlled. The characteristic curve depicted in FIG. 6 is used for the second electric motor with one or more pumps with a constant stroke volume. In this embodiment, the delivery volume is determined exclusively by the rotational speed of the second electric motor. If a plurality of pumps is used, a pump for the articulated steering of the wheel loader and a second pump for the work attachment can be present, for example. By controlling the rotational speed of the second electric motor, the direct control of the second electric motor allows the delivery quantity to be adapted to the required work situation. In conventional wheel loaders with an internal combustion engine, the pump is directly connected to the internal combustion engine, as a result of which free control of the pump is not possible.

The rotational speed of the second electric motor should be controlled as a function of the accelerator pedal signal and as a function of the rotational speed of the first electric motor. The ordinate in FIG. 6 therefore shows the rotational speed of the second electric motor, and the abscissa shows the actuation of the accelerator pedal or the accelerator pedal signal. At point 32, the accelerator pedal is not being actuated, whereby the vehicle is at a standstill. However, since steering movements must be possible at this standstill, the second electric motor is controlled at a minimum rotational speed, as can be seen at point 32. As the accelerator pedal signal increases, the rotational speed specification for the second electric motor is increased up to the maximum rotational speed 34 via the characteristic curve 33. A second dependence on the rotational speed of the first electric motor is used to limit the maximum rotational speed 34 of the second electric motor. If the first electric motor is at a low rotational speed, so that the vehicle moves at a low speed, the rotational speed of the first electric motor up to the maximum rotational speed must be possible. At a higher rotational speed of the first electric motor and thus a higher driving speed of the vehicle, it is possible to reduce the rotational speed of the second electric motor. This is due to the fact that the hydraulics for the bucket and the lifting mechanism do not have to be moved quickly at higher driving speeds. However, it is essential that a minimum rotational speed for the steering is maintained. By lowering the rotational speed of the second electric motor as a function of the rotational speed of the first electric motor and thus as a function of the driving speed, the efficiency of the system is increased. The lowering of the rotational speed of the second electric motor as a function of the rotational speed of the first electric motor is shown in FIG. 7.

Figure 7:
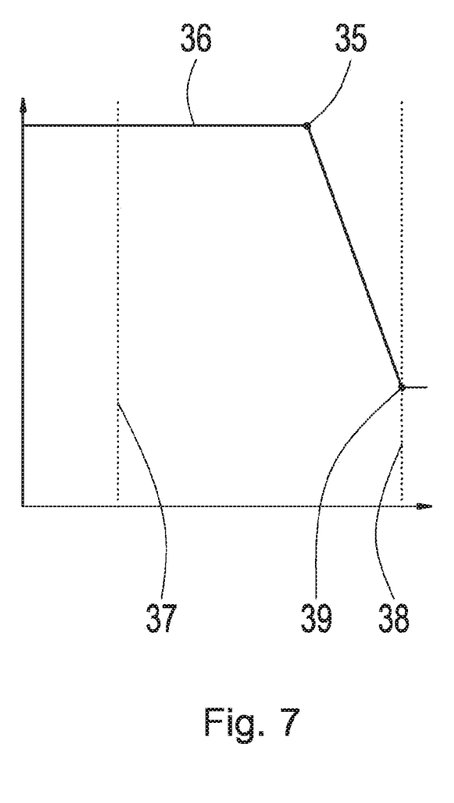
FIG. 7 depicts a characteristic curve for controlling the second electric motor.

FIG. 7:

The rotational speed of the second electric motor is plotted on the ordinate, and the rotational speed of the first electric motor is shown on the abscissa. Up to point 35, the vehicle is still at low driving speeds and the maximum possible rotational speed of the second electric motor, which is depicted by the characteristic curve 36, is not reduced. The line 37 shows the maximum rotational speed of the first electric motor or the maximum driving speed in the slow driving range, and the line 38 shows the maximum possible rotational speed of the first electric motor or the maximum driving speed of the vehicle in the fast driving range. The rotational speed of the second electric motor is reduced to point 39 in order to ensure a sufficient delivery quantity for the steering.

Figure 8:
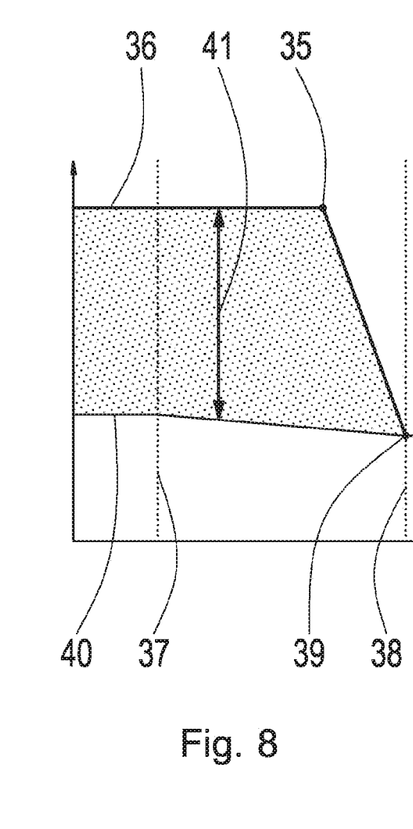
FIG. 8 depicts a characteristic curve for controlling the second electric motor.

FIG. 8:

If additional sensors are used either directly on the lifting mechanism or the bucket or on the multifunction lever, by means of which the lifting mechanism and the bucket can be controlled, the rotational speed of the second electric motor can be adjusted further according to the demand. The dependencies of the rotational speed specification for the second electric motor on the accelerator pedal position and on the rotational speed of the first electric motor remain. In addition, however, the information from the sensors relating to the actuation of the lifting mechanism and the bucket is used. These sensors supply a signal corresponding to the actuation, which signal can be, for example, a proportional signal. These sensor signals are calibrated and interpreted. Both signals can assume values of −100% to +100%, wherein for the lifting movement the sensor signal can be calibrated for maximum lowering, for example, to −100% and for the maximum lifting of the lifting movement can be calibrated to 100%. For the bucket movement, a sensor signal of −100% means a maximum downward tilting of the bucket and a sensor signal of +100% means a maximum upward tilting of the bucket. If the multifunction lever is not being actuated, and thus no movement of the work attachment or of the lifting mechanism and the bucket is requested, the sensors will each supply a signal of 0%. For the rotational speed specification of the second electric motor, the larger value of the two sensor signals should be used. FIG. 8 shows the dependency of the rotational speed specification for the second electric motor on the rotational speed of the first electric motor and the signal from the sensors of the work attachment. The rotational speed of the second electric motor is plotted on the ordinate, and the rotational speed of the first electric motor is plotted on the abscissa. The line 40 shows an increase in the rotational speed of the second electric motor with a simultaneous reduction in the rotational speed of the first electric motor. In this case, the line 37 is the maximum achievable rotational speed of the first electric motor in the slow driving range, and the line 38 is the maximum achievable rotational speed of the first electric motor in the fast driving range. The characteristic curve 36 with the points 35 and 39 corresponds to the characteristic curve 36 in FIG. 7. This rotational speed is now reduced to the line 40 depending on the sensor signal of the lifting attachment. This is depicted by the arrow 41.

Figure 9:
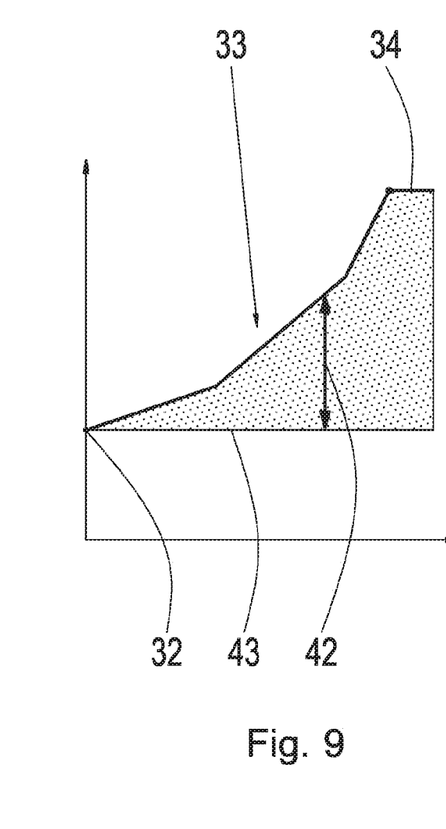
FIG. 9 depicts a characteristic curve for controlling the second electric motor as a function of the signal of the accelerator pedal and the multifunction lever.

FIG. 9:

FIG. 9 shows the reduction in the rotational speed of the second electric motor as a function of the sensors of the work attachment as described in FIG. 7. In this case, the diagram corresponds to the diagram according to FIG. 6 and the arrow 42 indicates that the rotational speed of the second electric motor is reduced as a function of the signals from the sensors of the work attachment. It is only possible to reduce the rotational speed of the second electric motor as far as the line 43.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Wheel loader
2 Battery
3 First electric motor
4 Second electric motor
5 Vehicle wheels
6 Pump
7 Lifting mechanism
8 Power electronics
9 Power electronics
10 Valves
11 Actuators
12 Sensor
13 Line
14 Display
15 Computation unit
16 Brake pedal
17 Accelerator pedal
18 Parking brake
19 Multifunction lever
20 Accelerator pedal signal
21 Torque
22 Rotational speed
23 Torque 0
24 Maximum torque
25 Intersection point
26 Maximum rotational speed
27 Line
28 Brake pedal signal
29 First part
30 Characteristic curve
31 Point
32 Point
33 Characteristic curve 34 Maximum rotational speed
35 Point
36 Characteristic curve
37 Characteristic curve
38 Line
39 Point
40 Line
41 Arrow
42 Arrow
43 Line

The invention claimed is:

1. A drive for a machine, the drive comprising:
a computer configured to control a first electric motor for driving vehicle wheels and a second electric motor for driving a work attachment,
wherein the second electric motor is configured to drive at least one hydraulic pump with an adjustable stroke volume,
wherein a sensor is configured to detect the stroke volume of the pump, and
wherein the computer processes the stroke volume to control the second electric motor.

2. The drive according to claim 1, wherein the pump is configured as a load-sensing pump.

3. The drive according to claim 1, wherein the sensor is configured to generate a signal which is supplied to the computer.

4. The drive according to claim 1, wherein a rotational speed of the second electric motor is increased when the pump is already being controlled to a nearly maximum stroke volume.

5. The drive according to claim 1, wherein the second electric motor is configured to not undershoot a previously defined minimum rotational speed.

6. The drive according to claim 1, wherein a speed of a change in a rotational speed of the second electric motor takes place as a function of a speed of a change in the stroke volume of the pump.

* * * * *